United States Patent [19]

Yamashita et al.

[11] Patent Number: 4,730,654
[45] Date of Patent: Mar. 15, 1988

[54] ASYMETRIC PNEUMATIC RADIAL TIRE TREAD FOR PASSENGER CAR

[75] Inventors: Takashi Yamashita; Tetsuya Kuze, both of Hiratsuka; Tuneo Morikawa, Hadano, all of Japan

[73] Assignee: The Yokohama Rubber Co., Ltd., Tokyo, Japan

[21] Appl. No.: 943,394

[22] Filed: Dec. 19, 1986

[30] Foreign Application Priority Data

Jan. 29, 1986 [JP] Japan .................................. 61-15740

[51] Int. Cl.$^4$ ............................................. B60C 11/11
[52] U.S. Cl. ............................ 152/209 A; 152/209 R
[58] Field of Search ........... 152/209 R, 209 A, 209 D

[56] References Cited

U.S. PATENT DOCUMENTS

| 3,217,776 | 11/1965 | Ellenrieder et al. | 152/209 A |
| 3,286,756 | 11/1966 | Ellenrieder et al. | 152/209 A |
| 3,674,077 | 7/1972 | Verdier | 152/209 R |
| 4,456,046 | 6/1984 | Miller | 152/209 R |
| 4,545,415 | 10/1985 | Lindner et al. | 152/209 R |

Primary Examiner—Michael Ball
Attorney, Agent, or Firm—Armstrong, Nikaido, Marmelstein & Kubovcik

[57] ABSTRACT

A pneumatic radial tire having a block pattern asymmetric about the right and left portions on the ground-contacting portion of the tire which has a specific area ratio of grooves and a specific angle of subgrooves on the ground-contacting portion of the tire.

1 Claim, 7 Drawing Figures

ASYMETRIC PNEUMATIC RADIAL TIRE TREAD FOR PASSENGER CAR

BACKGROUND

This invention relates to an improvement in block pattern provided on the ground-contacting portion of a tire. More particularly, the present invention is concerned with a pneumatic radial tire for passenger cars improved with respect to control stability on dry roads, control stability on wet roads and comfortableness in riding.

In recent years, with the development of networks of expressways and improved performance of passenger cars, more and more strict and various performance requirements have been applied to tires. For example, there have been proposed all season tires of which the traveling performance on wet roads is not very poor as compared with the traveling performance on dry roads and tires wherein a special belt material is used for improvement in the comfortableness in riding.

Meanwhile, it is known that since traveling performance on dry roads (dry control stability), traveling performance on wet roads (wet control stability) and comfortableness in riding interfere with each other, the improvement in one of the performances causes lowering in the other performances. Hitherto, tires meeting all the above requirements have not been proposed.

Accordingly, the present inventors have made various studies for simultaneously improving all of the above performance requirements. As a result, the present inventors have noted that (1) the control stability are mainly evaluated during cornering and (2) the comfortableness in riding is mainly evaluated during traveling on the straight. Further, in studying the functions of the block pattern of the ground-contacting portion of the tire, the present inventors have closely examined how the functions of the tires can be optimized under such conditions that the tires have been mounted on a vehicle, as opposed to the conventional method in which examinations were made using tires alone. Particularly, with respect to flat tires having a flatness ratio of 0.7 or less which has been used in recent years, it has become possible to disperse the functions of the ground-contacting portion of the tire in respective portions responsible for the function, because a large radial width (ground width) can be adopted. In other words, attempts have been made on the optimization of all the situations by maximizing the functions each associated with the performance which appears to be the most important under a certain situation.

SUMMARY

Accordingly, it is an object of the present invention to provide a radial tire improved with respect to control stability on dry roads, control stability on wet roads and comfortableness in riding by reforming the block pattern of the ground-contacting portion of a tire.

In accordance with the present invention, there is provided a pneumatic radial tire for passenger cars having, on the ground-contacting portion of the tire, a block pattern asymmetric about the right and left portions and formed by three or more straight grooves provided in the circumferential direction of the tire so as to form a loop and a plurality of subgrooves extending from the straight grooves towards the axial direction of the tire, characterized in (1) that the area ratio of the grooves in the inner half portion in the axial direction of the ground-contacting portion of the tire mounted on a vehicle is 1.2 to 1.4 times the area ratio of the grooves in the outer half portion in the axial direction of the ground-contacting portion of the tire, (2) that the angle of the subgrooves provided at the central portion in the axial direction of the ground-contacting portion of the tire relative to the circumferential direction of the tire is 45° to 75° and (3) that the angle of the subgrooves provided at both end portions in the axial direction of the ground-contacting portion of the tire relative to the circumferential direction of the tire is 65° to 90° and is by at least 5° larger than the angle of the subgrooves located at the central portion of the ground-contacting portion of the tire.

The foregoing and other objects and features will be apparent from the following descriptions.

THE DRAWINGS

FIGS. 1 and 2 each are a drawing illustrating an embodiment of the block pattern of a tire according to the present invention;

FIGS. 3 to 5 each are a drawing illustrating the block pattern of a conventional tire;

THE PREFERRED EMBODIMENTS

In general, in a pneumatic radial tire for passenger cars, a carcass layer of which the cord angle to the circumferential direction of the tire is 70° to 90° is provided between a pair of right and left bead portions. In the tread portion, a belt layer is provided on the carcass layer. Further, a tread pattern, i.e., block pattern which is divided into a plurality of blocks by grooves is formed on the ground-contacting portion of the tire.

An organic fiber such as nylon or polyester is generally used as a material for the carcass cord constituting the carcass layer. On the other hand, although a steel cord is mainly used as a cord constituting the belt layer, an aramid cord (which is an aromatic polyamide fiber cord) etc. may also be used.

Further, nowadays, there is also a tire in which a belt cover layer comprising a nylon cord is provided on the belt layer for the purpose of improving a high-speed durability. The cord angle of the nylon cord relative to the circumferential direction of the tire is substantially 0° (parallel).

Figure 1:
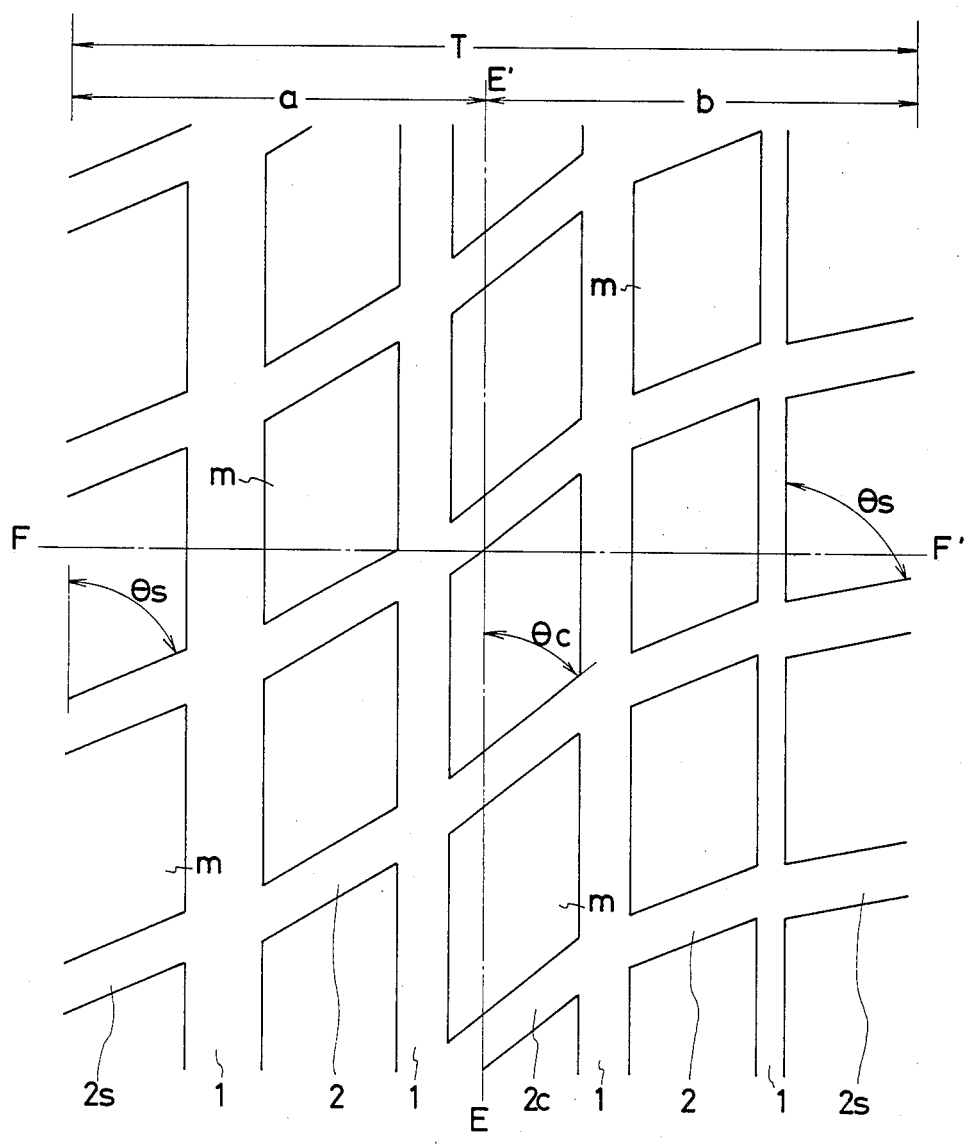
Figure 2:
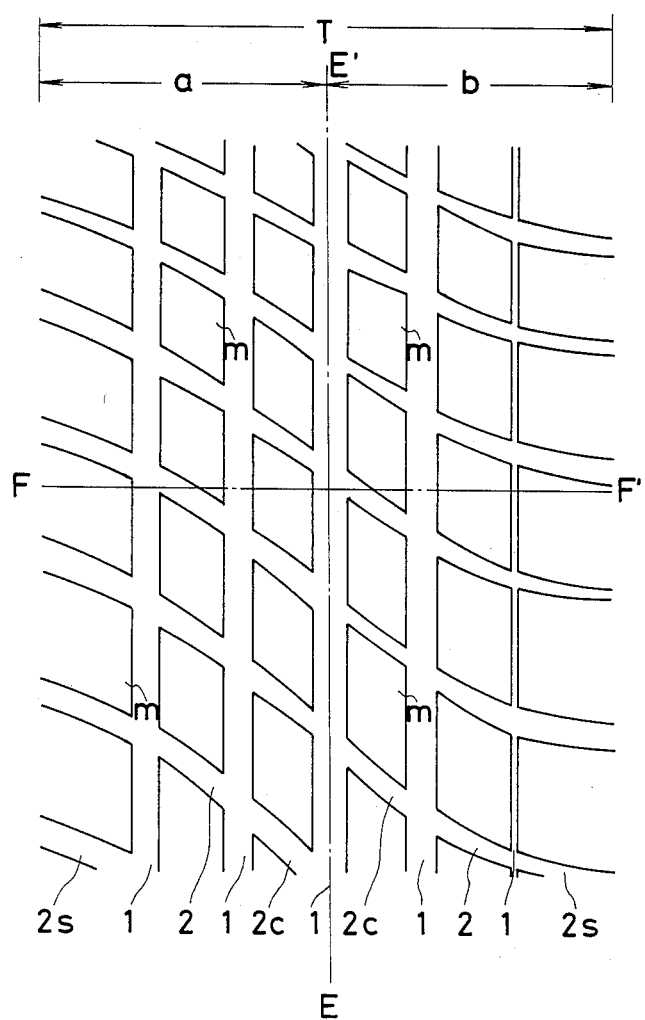

FIG. 1 shows an embodiment of the block pattern of the pneumatic radial tire for passenger cars according to the present invention. In FIG. 1 four straight grooves 1 are provided in a loop form in the circumferential direction E E' of the tire. Further, a plurality of subgrooves 2 extend from these straight grooves 1 to the axial direction of the tire (i.e. crosswise direction of the tire) FF'. The straight grooves 1 cooperate with the subgrooves 2 to form blocks m. 2c represents subgrooves provided at the central portion in the axial direction of the ground-contacting portion of the tire and 2s grooves provided at the both end portions in the axial direction of the ground-contacting portion of the tire. T represents the ground width of the tire. FIG. 2 shows another embodiment of the block pattern of the tire according to the present invention.

It is known that the controllability and stability on wet roads are mainly determined by the draining performance of the ground-contacting portion of a tire and the straight grooves provided in the circumferential direction of the tire exhibit an excellent draining effect. In the present invention, it is required that at least three straight grooves be provided. In this connection, it is noted that an increase in the number of the straight grooves does not necessarily lead to better results. A preferred number of the straight grooves is seven or less in view of the relationship with the blocks m. Specifically, good results can be obtained when the tires having flatnesses of 80%, 70%, 60% and 50% have three, four, five and six straight grooves, respectively.

In the present invention, the following three factors (1) to (3) were specified with respect to the block pattern asymmetric about the right and left portions as shown in FIGS. 1 and 2.

(1) The area ratio of the grooves in the inner half portion a in the axial direction of the ground-contacting portion of the tire mounted on a vehicle should be 1.2 to 1.4 times that of the grooves in the outer half portion b in the axial direction of the ground-contacting portion of the tire.

The above specification of the groove area was made based on the following finding. As a result of detailed studies on the behavior of tires during cornering of a vehicle, the present inventors have found the following points. The shift of the load is caused by centrifugal force during cornering. The outer portion of the tire mounted on a vehicle is important for the outer wheeling tire while the inner portion of the tire mounted on a vehicle is important for the inner wheeling tire. In this connection, an excellent control stability can be attained only when the groove area ratio of the inner portion is 1.2 to 1.4 times that of the outer portion.

Since the groove area ratio of the inner half portion a is large, the tire exhibits an excellent impact absorption at the time of getting over the disturbance, e.g. joints or gaps, which contributes to an excellent comfortableness in riding. When the ratio is less than 1.2 times, no sufficient effect can be obtained. On the other hand, when the ratio exceeds 1.4, the influence of the stiffness of the block m in the outer half portion b is increased, causing an insufficient degree of improvement.

(2) The angle $\theta c$ of the subgrooves 2c provided at the central portion in the radial direction of the ground-contacting portion of the tire relative to the circumferential direction EE' of the tire should be 45° to 75°.

On a road which is low in friction coefficient $\mu$ (mu) such as a wet road, the road gripping power under a light load at the time of change in load applied to the tire is of importance since the inertia force caused by braking and driving acts on the tire. Specifically, the angle of the subgrooves provided on the tire at its central portion which is the ground-contacting portion under a low load is of importance. When the angle is larger than 75° relative to the circumferential direction EE' of the tire, particularly close to 90°, no satisfactory draining effect can be obtained, leading to an insufficient gripping power. Therefore, the angle $\theta c$ should be 45° to 75°.

(3) The angle $\theta s$ of the subgrooves 2s provided at the both end portions in the radial direction of the ground-contacting portion of the tire relative to the circumferential direction EE' of the tire should be 65° to 90° and should be by at least 5° larger than the angle $\theta c$ of the subgrooves 2c provided at the central portion of the ground-contacting portion of the tire.

The reason why the angle $\theta s$ of the subgrooves 2s should be 65° to 90° is that in this angle range the traction of the outer wheeling tire of the vehicle is larger than that of the inner tire. Specifically, when the angle is smaller than 65°, the stiffness of blocks provided at the both end portions is too small, making impossible to obtain an effective difference in stiffness of the blocks. When the angle exceeds 90°, flection is unfavorably caused between the subgrooves provided at the central portion of the ground-contacting portion of the tire and the subgrooves provided at the both end portions in the radial direction of the tire, leading to lowering in the draining efficiency of the subgrooves. On the other hand, when the angle $\theta s$ is 65° to 90°, the tires themselves impart a toe-in effect to the vehicle during steering, leading to an excellent control stability. In this connection, it is preferred that the angle $\theta s$ of subgrooves 2s provided at the outer end portion in the axial direction of the ground-contacting portion of the tire be 75° to 90° while the angle $\theta s$ of subgrooves 2s provided at the inner end portion in the axial direction of the ground-contacting portion of the tire be 65° to 75°.

The reason why $\theta s$ should be by at least 5° larger than $\theta c$ is as follows. The shifting of the load due to the centrifugal force during cornering increases the importance of the stiffness of outer wheeling blocks. Since the angle of the grooves of the both end portions is larger than that of the grooves of the central portions (i.e. close to 90° with respect to the grooves of the radial direction), the stiffness of the blocks in the axial direction becomes larger than that of the blocks in the central portion, leading to an excellent cornering performance, i.e. excellent control stability.

The following Example specifically illustrates the effect of the present invention.

EXAMPLE

The evaluation of performance was made on the following tire of the present invention and comparative tires. The results are shown below.

(a) Tire of the Present Invention

An asymmetric tread pattern as shown in FIG. 1 was engraved on a slick tire having a size of 185/70 R13. The area ratio of the grooves of the inner half portion a was 1.3 times that of the grooves of the outer half portion b. The angle $\theta c$ of the subgrooves provided at the central portion was 50°. The angle $\theta s$ of the subgrooves provided at the outer end portion was 80°. The angle $\theta s$ of the subgrooves provided at the inner end portion was 70°. The percentage of the overall groove area was 40%.

(b) Comparative Tire

Figure 3:
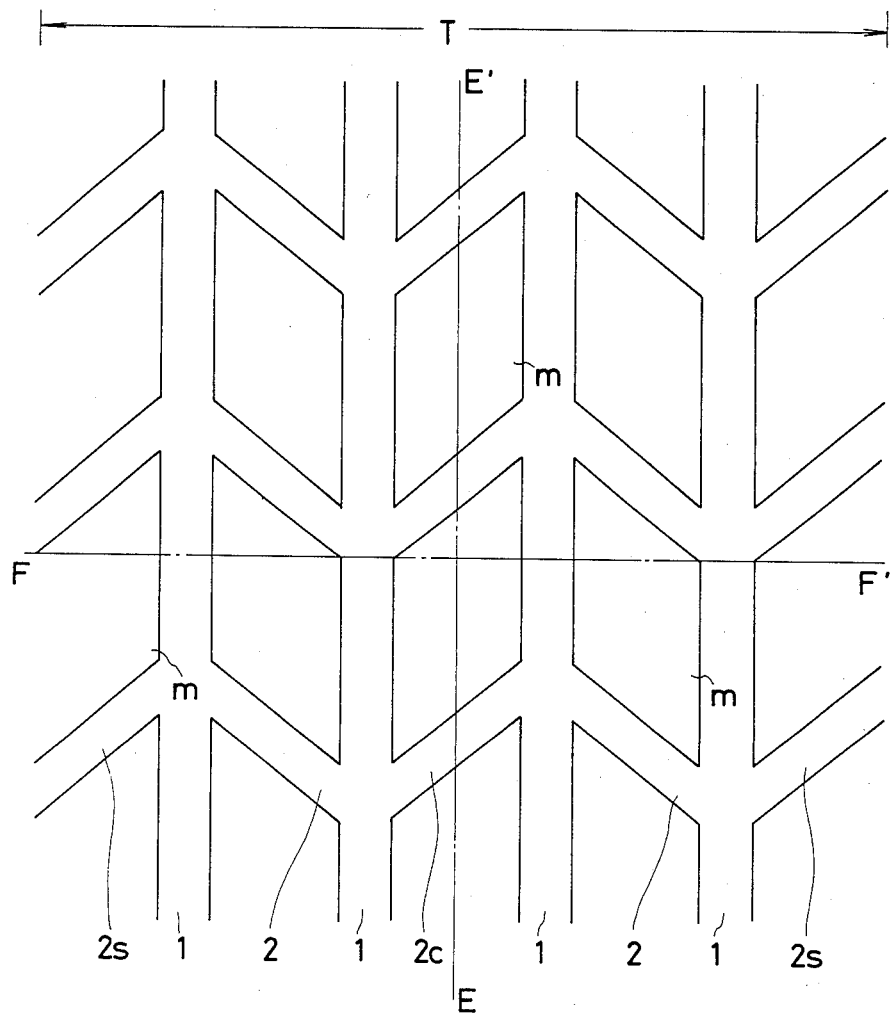

A symmetric tread pattern as shown in FIG. 3 was engraved on a slick tire having a size of 185/70 R13. The right and left portions, i.e. the inner side and outer side of the tread pattern of the tire mounted on the vehicle were substantially the same (i.e. point-symmetrical). All the angles of the subgrooves was 50°. The percentage of the overall groove area was 40%.

(c) Comparative Tire 2

Figure 4:
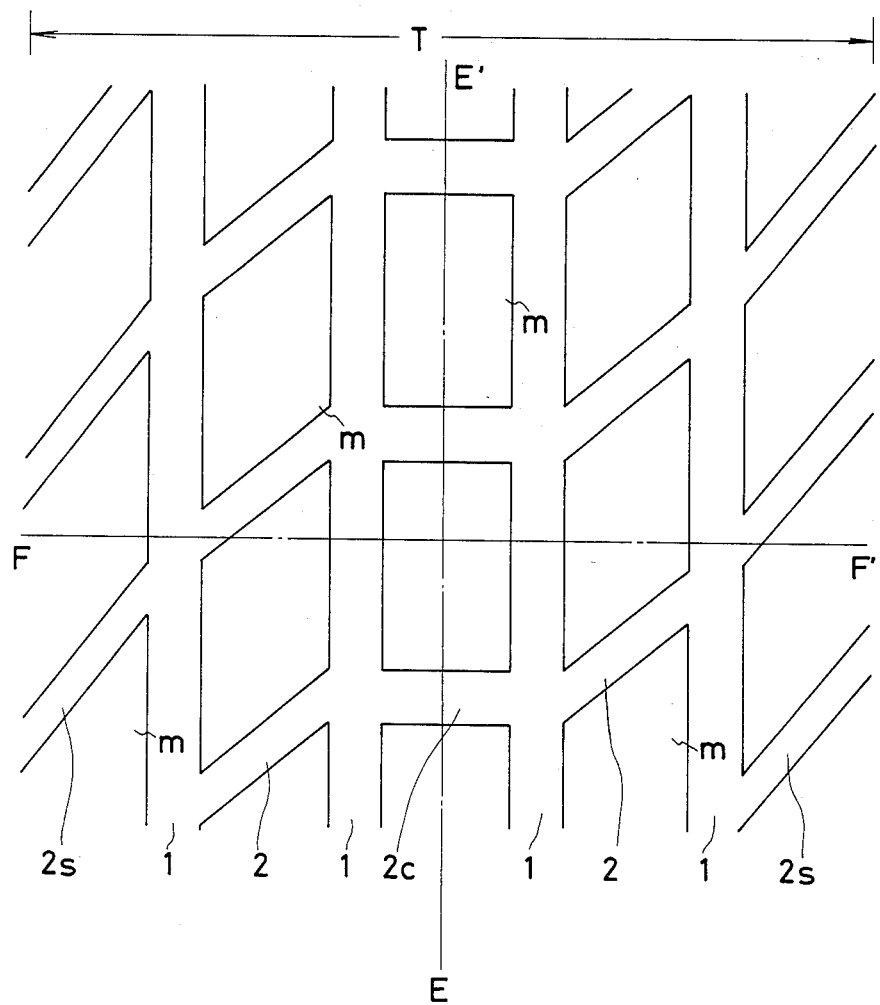

A symmetric tread pattern as shown in FIG. 4 was engraved on a slick tire having a size of 185/70 R13. The right and left portions, i.e. the inner side and outer side of the tread pattern of the tire mounted on the vehicle were substantially the same (i.e. point-symmetrical). The angle of the subgrooves provided at the central portion was 90°. The angle of the subgrooves provided at the both end portions was 40°. The percentage of the overall groove area was 40%.

(d) Comparative Tire 3

Figure 5:
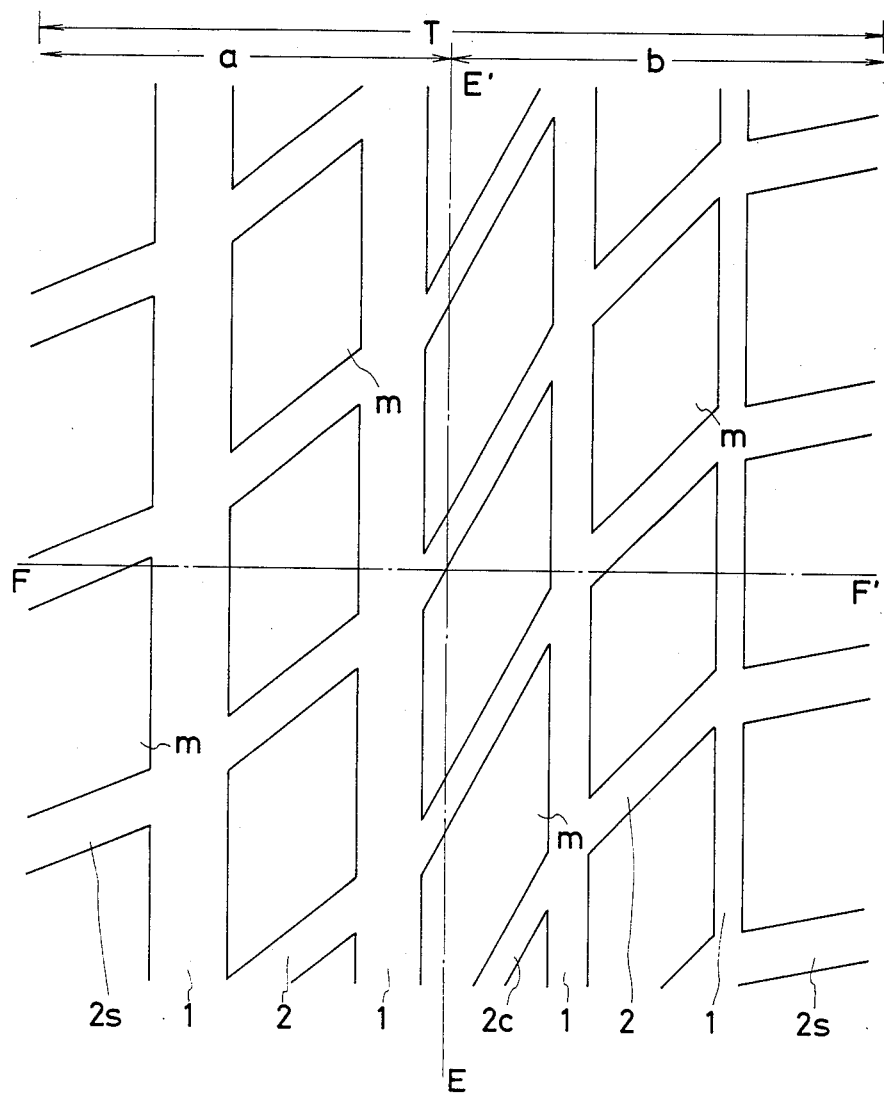

An asymmetric tread pattern as shown in FIG. 5 was engraved on a slick tire having a size of 185/70 R13. The area ratio of the grooves of the inner half portion a was 1.5 times that of the grooves of the outer half portion b. The angle of the subgrooves provided at the central portion was 30°. The angle of the subgrooves provided at the outer end portion was 80°. The angle of the subgrooves provided at the inner end portion was 70°. The percentage of the overall groove area was 40%.

Control Stability

Indoor cornering tests were conducted to determine characteristics which can serve as a substitute for control stability. The results are shown in FIG. 6.

Figure 6:
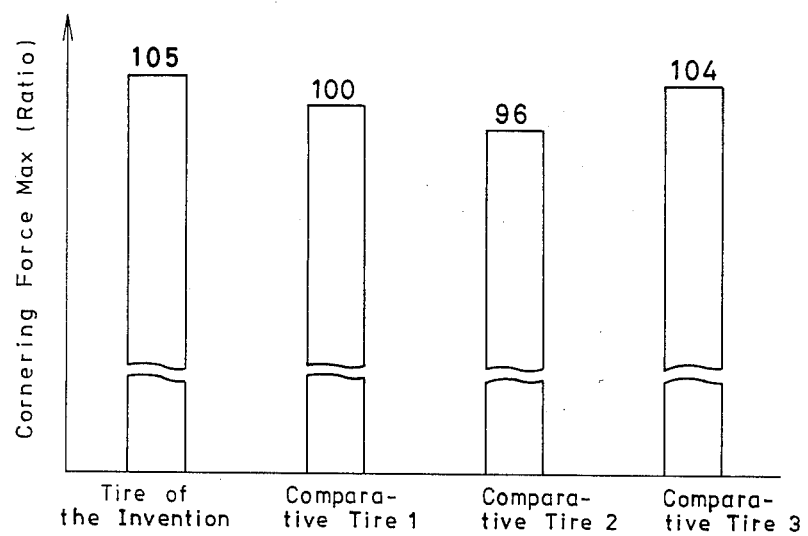
FIG. 6 is a graph illustrating the cornering forces of tires.

In FIG. 6, the maximum cornering force determined under an internal pressure of 1.9 kg/cm², a load of 450 kg/tire, a rim of 5J×13, a speed of 20 km/h and a drum diameter of 2,500 was expressed in terms of ratio taking the maximum cornering force of Comparative Tire 1 as 100. The larger the value, the better the performance. The value on the asymmetric tread pattern was that of the outer wheeling side.

From FIG. 6, it is clear that the tire of the present invention is excellent in cornering performance.

Movement Performance on Wet Road

Figure 7:
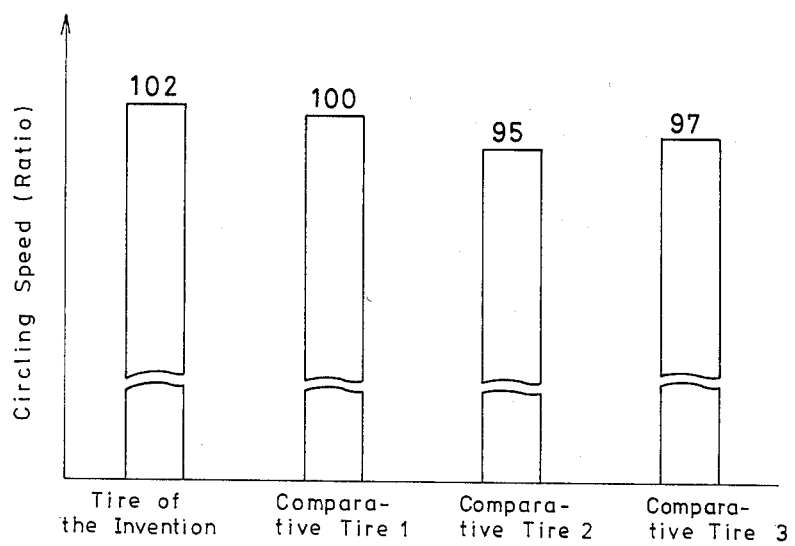
FIG. 7 is a graph illustrating the circling speed of tires on wet road.

The vehicles on which the tires were mounted was allowed to circle around on a wet road having a radius of 30 m to determine characteristics which can serve as a substitute for movement performance on wet road. The results are shown in FIG. 7 in which the maximum speed is expressed in terms of ratio taking the maximum speed of Comparative Tire 1 as 100. The larger the value, the better the upper limit. The determination was conducted at an internal pressure of 1.9 kg/cm² using a rim of 5J×13.

From FIG. 7, it is clear that the tire of the present invention is excellent in the performance.

Comfortableness in Riding

The comfortableness in riding was evaluated by four professional drivers got on the vehicle. With respect to the tire of the present invention an excellent comfortableness was attained. On the other hand, with respect to Comparative Tires 2, 3 and 4, no improvement over Comparative Tire 1 was attained.

Subsequently, a tire having an asymmetric tread pattern as shown in FIG. 2 was prepared using a mold and subjected to the same evaluation tests as mentioned above. As a result, it was confirmed that the tire was excellent in respect of all the characteristics. The tire was 185/70 R13 in size, 40% in percentage of the overall groove area, 1.5 times in the area ratio of the grooves of the inner half portion a relative to that of the grooves of the outer half portion b, 50° and 60° in the angle of the subgrooves provided at the central portion, 80° in the angle of the subgrooves provided at the outer end portion and 70° in the angle of the subgrooves provided at the inner end portion.

As is apparent from the foregoing, the specification of the above factors (1) to (3) according to the present invention enables the control stability on dry roads, control stability on wet roads and comfortableness in riding to be improved at the same time.

We claim:

1. A pneumatic radial tire for passenger cars having, on the ground-contacting portion of the tire, a block pattern asymmetric about the right and left portions and formed by three or more straight grooves provided in the circumferential direction of said tire so as to form a loop and a plurality of subgrooves extending from the straight grooves towards the axial direction of said tire, wherein (1) the area ratio of the grooves in the inner half portion in the axial direction of the ground-contacting portion of said tire mounted on a vehicle is 1.2 to 1.4 times that of the grooves in the outer half portion in the axial direction of the ground-contacting portion of the tire, (2) the angle of the subgrooves provided at the central portion in the axial direction of the ground-contacting portion of said tire relative to the circumferential direction of said tire is 45° to 75° and (3) the angle of the subgrooves provided at both end portions in the axial direction of the ground-contacting portion of said tire relative to the circumferential direction of said tire is 65° to 90° and is by at least 5° larger than that of the subgrooves located at the central portion of the ground-contacting portion of said tire.

* * * * *